(12) United States Patent
Motoyama et al.

(10) Patent No.: US 9,347,534 B2
(45) Date of Patent: May 24, 2016

(54) BALL SCREW DEVICE AND ELECTRIC POWER STEERING SYSTEM INCLUDING THE SAME

(71) Applicant: JTEKT CORPORATION, Osaka-shi, Osaka (JP)

(72) Inventors: Satoshi Motoyama, Knoxville, TN (US); Masashi Yamaguchi, Toyota (JP)

(73) Assignee: JTEKT CORPORATION, Osaka-shi (JP)

(*) Notice: Subject to any disclaimer, the term of this patent is extended or adjusted under 35 U.S.C. 154(b) by 333 days.

(21) Appl. No.: 14/043,262

(22) Filed: Oct. 1, 2013

(65) Prior Publication Data

US 2014/0096634 A1    Apr. 10, 2014

(30) Foreign Application Priority Data

Oct. 10, 2012  (JP) ................................. 2012-225178

(51) Int. Cl.
| | |
|---|---|
| *F16H 25/22* | (2006.01) |
| *F16H 25/12* | (2006.01) |
| *B62D 5/04* | (2006.01) |

(52) U.S. Cl.
CPC ............ *F16H 25/12* (2013.01); *F16H 25/2214* (2013.01); *B62D 5/0448* (2013.01); *Y10T 74/19767* (2015.01)

(58) Field of Classification Search
CPC .... F16H 25/2214; F16H 25/12; B62D 5/0448
USPC ........ 74/89.23, 89.34, 216.3, 388 PS, 424.71, 74/424.81, 424.82, 424.84, 424.86, 74/424.87; 180/444
See application file for complete search history.

(56) References Cited

U.S. PATENT DOCUMENTS

| | | | | |
|---|---|---|---|---|
| 3,869,936 | A | * 3/1975 | Taillardat | ............ F16H 25/2204 74/424.87 |
| 4,864,884 | A | 9/1989 | Klinkenberg | |
| 5,142,929 | A | 9/1992 | Simpson, III | |
| 6,082,209 | A | * 7/2000 | Yabe | ................... F16H 25/2204 74/424.83 |
| 6,176,149 | B1 | * 1/2001 | Misu | ................... F16C 33/3706 384/45 |
| 6,186,268 | B1 | * 2/2001 | Onodera | .............. B62D 5/0448 180/444 |
| 6,397,697 | B1 | * 6/2002 | Ninomiya | ........... F16H 25/2223 74/424.83 |

(Continued)

FOREIGN PATENT DOCUMENTS

| | | |
|---|---|---|
| EP | 0 636 816 A1 | 2/1995 |
| JP | A-11-270648 | 10/1999 |
| JP | 2011-051386 A | 3/2011 |

OTHER PUBLICATIONS

Oct. 30, 2015 Extended European Search Report issued in European Patent Application No. 13187309.3.

*Primary Examiner* — William Kelleher
*Assistant Examiner* — Bobby Rushing, Jr.
(74) *Attorney, Agent, or Firm* — Oliff PLC

(57) ABSTRACT

A ball screw nut of a ball screw device is fastened to a motor shaft by engaging a male thread portion thereof with a female thread portion of the motor shaft. In a case where, in a movement pathway for balls, an area where the balls roll under load from a rack shaft and the ball screw nut is set as a load area, an area that does not receive the load is set as a no-load area, and areas for transition from the load area to the no-load area are set as transition areas, the male thread portion is formed such that the transition area on the nut-side joint portion-side closest to a seating surface does not overlap phase ranges of cut portions in a state where the ball screw nut is fastened to the motor shaft.

3 Claims, 6 Drawing Sheets

(56) References Cited

U.S. PATENT DOCUMENTS

| | | | | |
|---|---|---|---|---|
| 6,450,055 B1 * | 9/2002 | Sekiya | ............... | F16H 25/2214 74/424.87 |
| 7,305,902 B2 * | 12/2007 | Inoue | ............... | F16H 25/2233 74/424.85 |
| 8,397,859 B2 * | 3/2013 | Asakura | ............... | B62D 5/0448 180/444 |
| 2011/0296939 A1 * | 12/2011 | Kaneko | ............... | F16H 25/2214 74/424.87 |

* cited by examiner

BALL SCREW DEVICE AND ELECTRIC POWER STEERING SYSTEM INCLUDING THE SAME

INCORPORATION BY REFERENCE

This application claims priority to Japanese Patent Application No. 2012-225178 filed on Oct. 10, 2012 the disclosure of which, including the specification, drawings and abstract, is incorporated herein by reference in its entirety.

BACKGROUND OF THE INVENTION

1. Field of the Invention

The invention relates to a ball screw device and an electric power steering system including the ball screw device.

2. Description of Related Art

In related art, there is a so-called rack assist type electric power steering system including a hollow shaft in which a rack shaft is inserted and which is rotated by motor drive, the electric power steering system applying an assist force to a steering system by converting the rotation of the hollow shaft to the axial movement of the rack shaft by a ball screw device (for example, US 2011/0296939 A1).

In general, such a ball screw device is formed by disposing a plurality of balls in a spiral ball raceway which is formed by a thread groove formed in the outer periphery of the rack shaft and a thread groove formed in the inner periphery of a ball screw nut, the thread groove formed in the outer periphery of the rack shaft facing the thread groove formed in the inner periphery of the ball screw nut. Each ball in the ball raceway is sandwiched between the rack shaft and the ball screw nut, and rolls in the ball raceway under load (a frictional force) from the ball screw nut and the rack shaft when the ball screw nut rotates relatively with respect to the rack shaft. Further, the ball screw device has a circulation path that connects two points set in the ball raceway. Each ball that rolls in the ball raceway passes through the circulation path, thereby moving between the two points, that is, returning from the downstream side to the upstream side. When the ball newly enters the circulation path from the ball raceway, each ball in the circulation path is pushed by the other ball adjacent to and posterior to the ball in a circulation direction (a moving direction) of the balls. Thus, the balls move in the circulation path. In the ball screw device, the balls infinitely circulate in a movement pathway which is formed by the ball raceway and the circulation path, thereby converting the rotation of the ball screw nut to the axial movement of the rack shaft.

As for the ball screw device, as described in US 2011/0296939 A1, a so-called deflector type ball screw device is known in which the circulation path is configured by fitting a deflector having a function of taking up balls from a ball raceway and a function of discharging the balls to the ball raceway, in a fitting hole that radially extends through the ball screw nut. In the deflector type ball screw device, a difference in level may be caused in a joint portion between the ball raceway and the circulation path due to a dimensional accuracy of the deflector, or the like. Therefore, for example, in a ball screw device described in Japanese Patent Application Publication No. 11-270648 (JP 11-270648 A), a difference in level is eliminated by performing level difference processing such as polishing on a joint portion between a deflector and a ball screw nut after the deflector is fitted.

As a structure for fixing the ball screw nut to the hollow shaft, for example, as described in US 2011/0296939 A1, a structure is known in which a hollow cylindrical male thread portion is formed in the ball screw nut, and the male thread portion is engaged with a female thread portion formed in the hollow shaft so as to fasten the ball screw nut to the hollow shaft. In order to restrict the rotation of the hollow shaft when fastening the ball screw nut, it is conceivable that a cut portion is formed in a seating surface (an axial end face that axially faces the ball screw nut) of the hollow shaft and a jig for fixing is engaged with the cut portion.

However, if the cut portion is formed in the seating surface, when the ball screw nut is pressed against the seating surface by an axial force that is generated by the engagement of the male thread portion and the female thread portion, a site in the ball screw nut, which faces the cut portion, is inserted into the cut portion so as to bulge out into the cut portion, whereby the ball screw nut is easily deformed. As a result, there is a problem that a distortion occurs in the thread groove of the ball screw nut, whereby smooth circulation of the balls in the movement pathway is hindered and for example, abnormal noise is caused.

SUMMARY OF THE INVENTION

The invention provides a ball screw device in which smooth circulation of balls can be secured, and an electric power steering system including the ball screw device.

According to a feature of an example of the invention, there is provided a ball screw device including: a threaded shaft having an outer periphery in which a shaft-side thread groove is formed; a ball screw nut having an inner periphery in which a nut-side thread groove is formed; and a plurality of balls disposed in a spiral ball raceway that is formed by the shaft-side thread groove and the nut-side thread groove that face each other, wherein a circulation member is fitted to fitting holes so that a circulation path is configured, the fitting holes radially extending through a main body portion of the ball screw nut, the main body portion having the nut-side thread groove, and the circulation path connecting two points in the ball raceway so as to allow infinite circulation of the balls that roll in the ball raceway, wherein a male thread portion is formed in the ball screw nut, the male thread portion protruding from the main body portion in an axial direction, and the male thread portion being screwed to a female thread portion formed in a fitting target, wherein a cut portion extending in a radial direction is formed in a seating surface of the fitting target, the seating surface facing the ball screw nut in the axial direction, and wherein in a case where, in a movement pathway for the balls, which is formed by the ball raceway and the circulation path, an area where the balls roll under load from the threaded shaft and the ball screw nut is set as a load area, an area where each of the balls moves by being pushed by the other ball adjacent to and posterior to the ball in a circulation direction of the balls is set as a no-load area, and areas, each of which is located between the load area and the no-load area, are set as transition areas, the male thread portion is formed such that the transition area closest to the seating surface does not overlap a phase range of the cut portion in a state where the ball screw nut is fastened to the fitting target.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
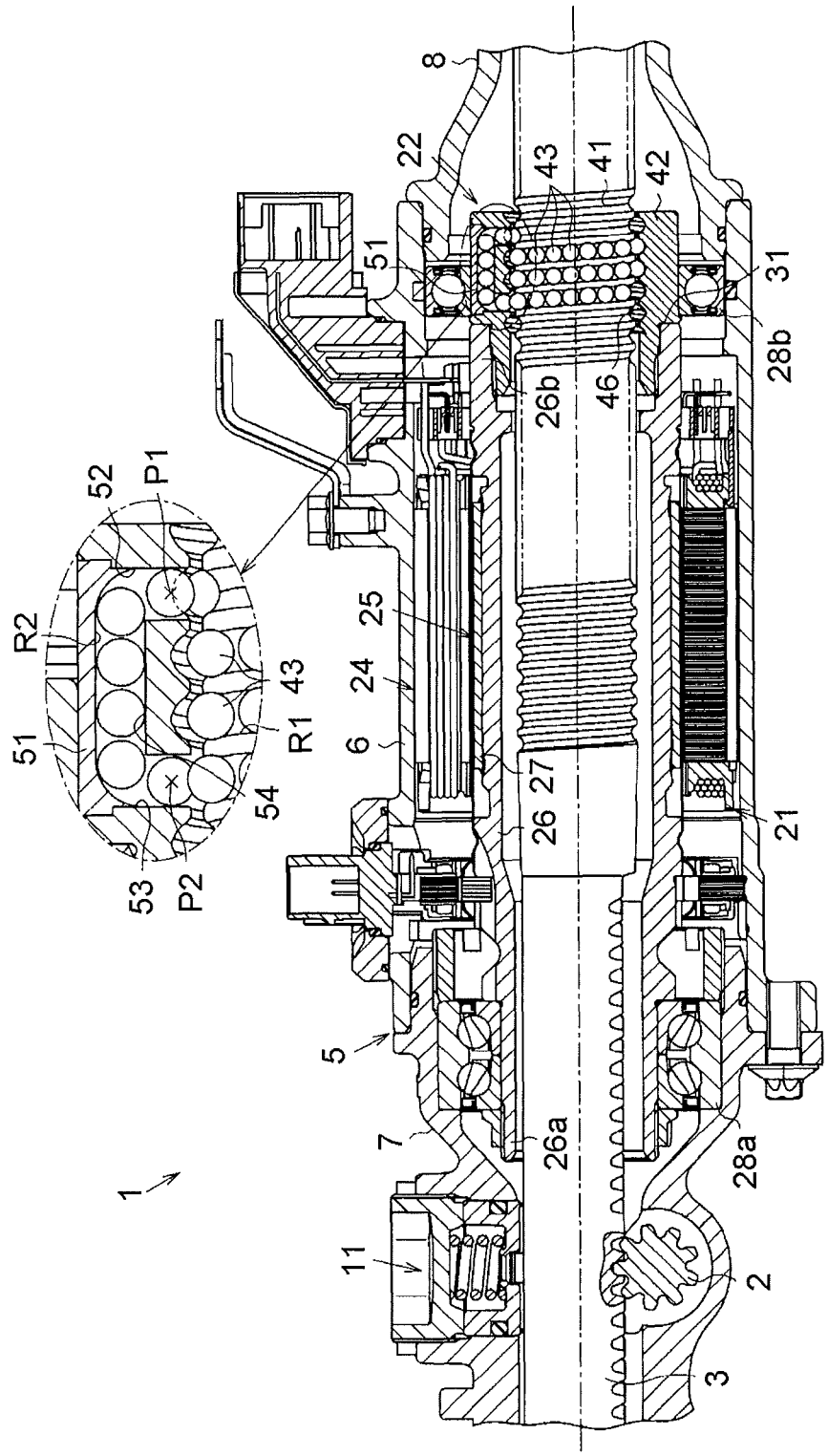
FIG. 1 is a sectional view showing a schematic configuration of an electric power steering system.

Hereinafter, an embodiment of a ball screw device and an electric power steering system (EPS) including the ball screw device will be described with reference to the drawings. As shown in FIG. 1, an EPS 1 includes a pinion shaft 2 that is rotated by a steering operation, and a rack shaft 3 that changes a steering angle of a steered wheel (not shown) by reciprocating in an axial direction in response to the rotation of the pinion shaft 2. Further, the EPS 1 includes a substantially cylindrical rack housing 5 in which the rack shaft 3 is inserted. The rack housing 5 includes a center housing 6 formed in a substantially cylindrical shape, a gear housing 7 fixed to one end side (in FIG. 1, the left side) in the axial direction of the center housing 6, and an end housing 8 fixed to the other end side (in FIG. 1, the right side) in the axial direction of the center housing 6.

The rack shaft 3 is supported by a rack guide 11 provided in the gear housing 7 and a bush (not shown) provided in the end housing 8, so as to be able to reciprocate along the axial direction thereof. Further, in the rack housing 5, the pinion shaft 2 is rotatably supported in a state of obliquely crossing the rack shaft 3 and the rack shaft 3 is meshed with the pinion shaft 2 by being urged by the rack guide 11. In addition, a steering shaft (not shown) is connected to the pinion shaft 2 and a steering wheel (not shown) is fixed to a leading end of the steering shaft. The pinion shaft 2 is rotated in response to a steering operation, and the rotation thereof is converted to the axial movement of the rack shaft 3, whereby the steering angle of the steered wheel, that is, a traveling direction of a vehicle is changed.

Further, the EPS 1 includes a motor 21 that is a drive source thereof, and a ball screw device 22 that converts the rotation of the motor 21 to the axial movement of the rack shaft 3. That is, the EPS 1 of this embodiment is configured as a so-called rack assist type EPS.

First, the configuration of the motor will be described. The motor 21 is configured as a brushless motor including a stator 24 that is fixed to the inner periphery of the center housing 6, and a rotor 25 that is rotatably provided inside the stator 24. The rotor 25 has a motor shaft 26 as a hollow shaft formed in the form of a hollow cylinder, and a magnet 27 that is fixed to the outer periphery of the motor shaft 26. An opening end portion 26a on the gear housing 7-side in the motor shaft 26 is rotatably supported by a first bearing 28a. The rack shaft 3 is inserted into the motor shaft 26, whereby the motor 21 is disposed coaxially with the rack shaft 3. In the motor 21 configured in this manner, the motor shaft 26 (the rotor 25) is rotated by magnetic suction force and repulsive force which are generated between a magnetic field that is formed by supplying drive electric power to the stator 24, and the magnet 27.

Figure 2:
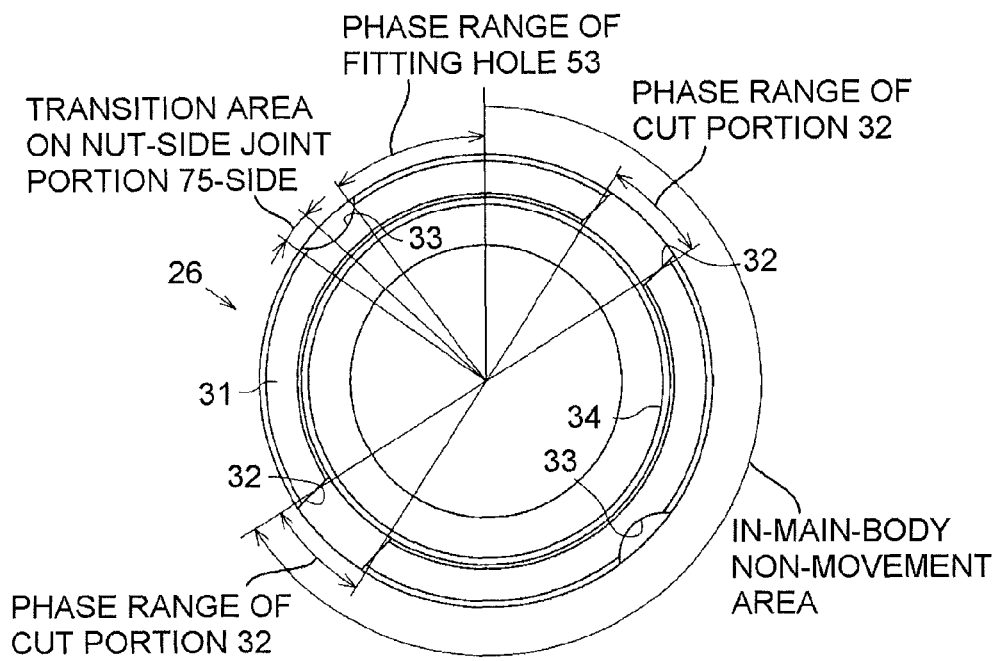
FIG. 2 is a front view showing a motor shaft when viewed from a ball screw nut-side in an axial direction.
Figure 3:
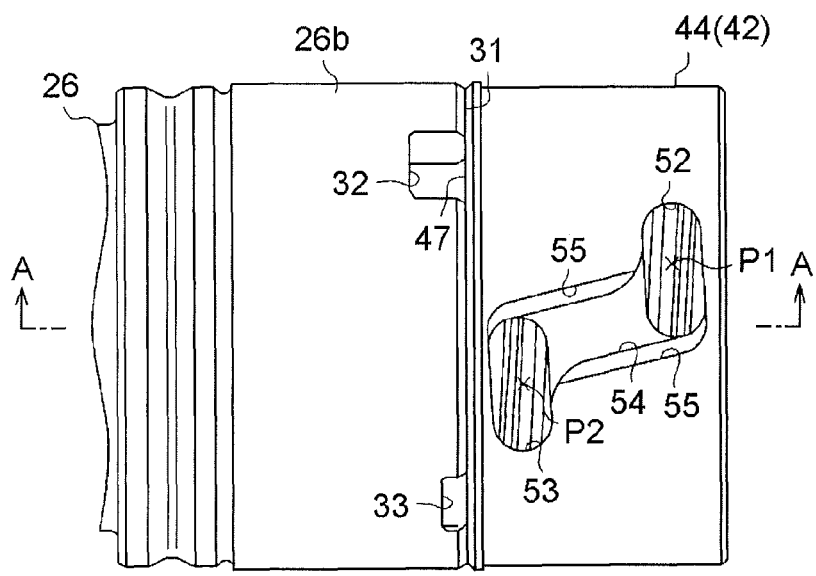
FIG. 3 is a partial side view showing the ball screw nut in a state where a circulation member is removed and the motor shaft, when viewed from the outside in a radial direction.
Figure 4:
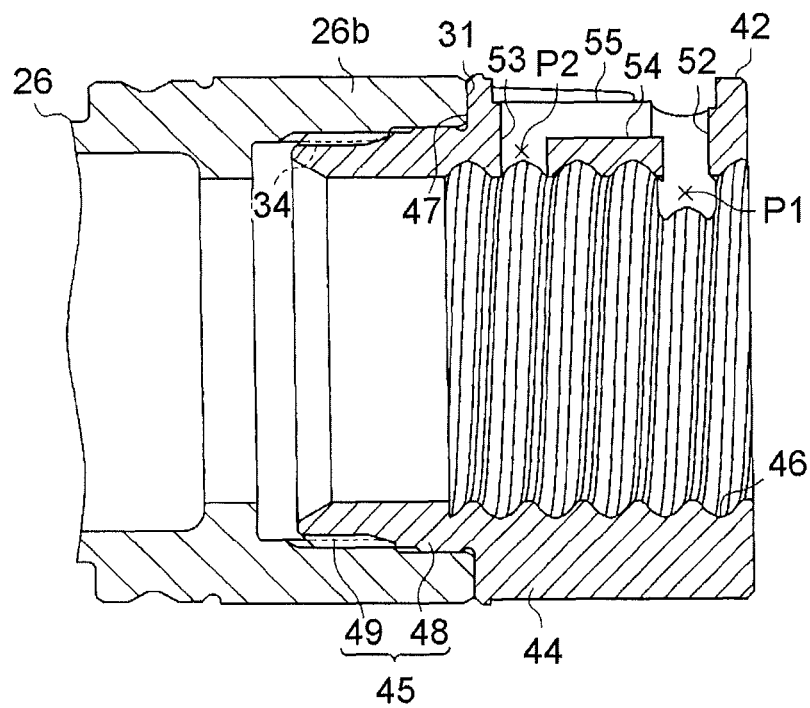
FIG. 4 is a sectional view taken along line A-A in FIG. 3.
Figure 5:
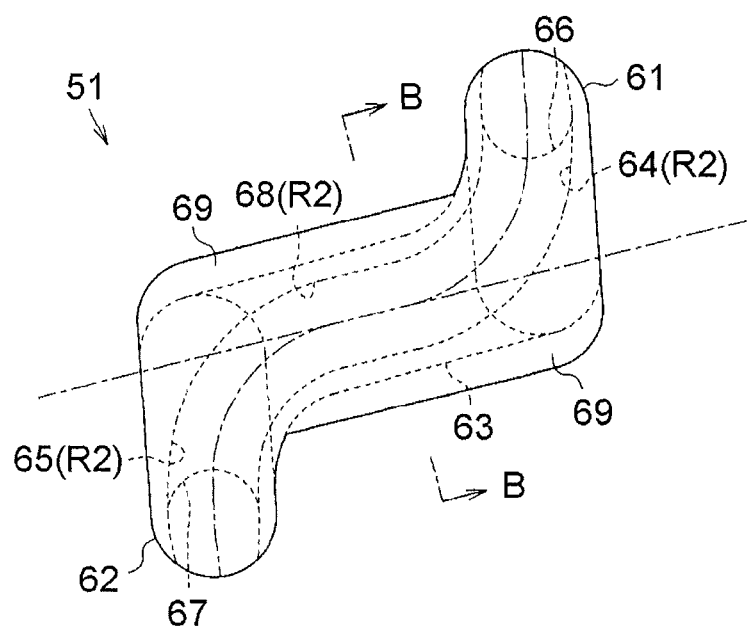
FIG. 5 is a plan view showing the circulation member when viewed from the outside in the radial direction of the ball screw nut.
Figure 6:
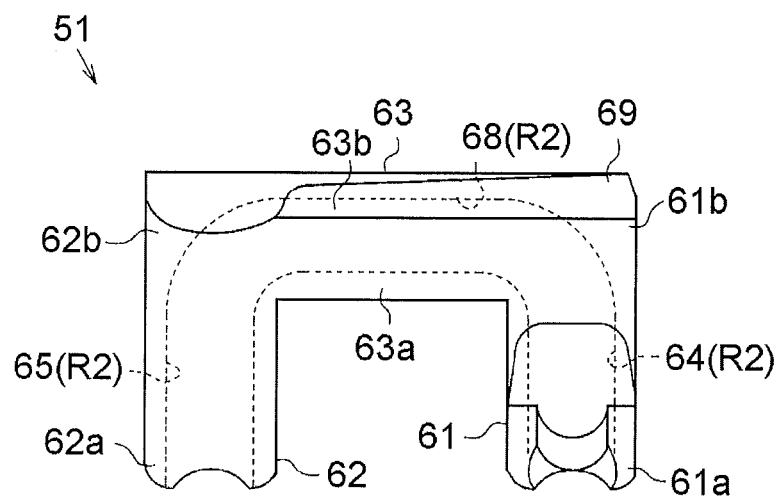
FIG. 6 is a front view showing the circulation member when viewed from a circumferential direction of the ball screw nut.

As shown in FIGS. 2 and 3, in a seating surface 31 that is an end face in an opening end portion 26b on a side, to which a ball screw nut 42 (described later) is connected, in the motor shaft 26, a plurality of (in this embodiment, two) cut portions 32 is formed. The cut portions 32 extend in the axial direction from the seating surface 31 and extend through the inner and outer peripheries of the motor shaft 26. That is, the cut portions 32 are formed to radially extend through the motor shaft 26 that is a fitting target. Further, a plurality of (in this embodiment, two) recessed portions 33 is formed in the seating surface 31. The recessed portions 33 extend in the axial direction from the seating surface 31 and are opened in the outer peripheral surface of the motor shaft 26 without extending through the inner and outer peripheries of the motor shaft 26. Specifically, when viewed from the seating surface 31-side, each of the cut portions 32 is formed in the form of a groove extending in a radial direction of the motor shaft 26 and having a substantially constant width. Each of the recessed portions 33 is formed in a substantially semicircular shape in the outer periphery of the motor shaft 26. In addition, the cut portions 32 and the recessed portions 33 are provided at equal angular intervals so as to be arranged alternately in a circumferential direction. Further, as shown in FIG. 4, in the inner peripheral surface of the motor shaft 26, a female thread portion 34 is formed to extend from a position spaced toward the inner side (in FIG. 4, the left side) from the seating surface 31, and to extend further toward the inner side. When fastening the ball screw nut 42 of the ball screw device 22 (described later), a jig for fixing (not shown) is engaged with the cut portions 32, whereby the rotation of the motor shaft 26 is restricted. Further, when the motor shaft 26 is caused to stand on a work table (not shown) in the process of manufacturing the EPS 1, protruding portions (not shown) provided at the work table are engaged with the recessed portions 33, whereby the motor shaft 26 is prevented from falling down.

Next, the configuration of the ball screw device will be described. As shown in FIG. 1, a shaft-side thread groove 41 is formed in a portion of the outer periphery of the rack shaft 3. That is, in this embodiment, the rack shaft 3 corresponds to a threaded shaft. The ball screw device 22 includes the ball screw nut 42 which rotates together with the motor shaft 26 as the fitting target, and is configured by screwing the ball screw nut 42 to the rack shaft 3 with a plurality of balls 43 interposed between the ball screw nut 42 and the rack shaft 3. The ball screw nut 42 is rotatably supported by a second bearing 28b provided on the inner peripheral surface of the center housing 6.

As shown in FIGS. 3 and 4, the ball screw nut 42 has a main body portion 44 formed in a cylindrical shape and disposed outside the motor shaft 26, and an engagement portion 45 that is inserted from the opening end portion 26b on the end housing 8-side in the motor shaft 26 into the inside. A nut-side spiral thread groove 46 is formed in the inner periphery of the ball screw nut 42. The nut-side spiral thread groove 46 extends over a range that includes the entire main body portion 44 and a portion of the engagement portion 45. The outside diameter of the main body portion 44 is formed to be substantially equal to the outside diameter of the motor shaft 26, and a contact surface 47, which is an axial end face on the engagement portion 45-side in the main body portion 44, contacts the seating surface 31 of the motor shaft 26.

The engagement portion 45 is formed to be continuous with the main body portion 44 in the axial direction, and has a fitting portion 48 and a hollow cylindrical male thread portion 49. The fitting portion 48 is fitted to a portion of the inner surface of the opening end portion 26b of the motor shaft 26. The female thread portion 34 is not formed in the portion of the inner surface of the opening end portion 26b. The male thread portion 49 extends from the fitting portion 48 to one end side in the axial direction and is engaged with the female thread portion 34 of the motor shaft 26. The male thread portion 49 is engaged with the female thread portion 34, whereby the ball screw nut 42 is fastened to the motor shaft 26 such that the nut-side thread groove 46 radially faces the shaft-side thread groove 41. More specifically, the ball screw nut 42 is fastened with the contact surface 47 thereof being pressed against the seating surface 31 of the motor shaft 26 by an axial force that is generated by engaging the male thread portion 49 with the female thread portion 34. In this way, as shown in FIG. 1, a spiral ball raceway R1 is formed by the shaft-side thread groove 41 of the rack shaft 3 and the nut-side thread groove 46 of the ball screw nut 42.

The balls 43 are disposed in the ball raceway R1 and each ball 43 is sandwiched between the shaft-side thread groove 41 of the rack shaft 3 and the nut-side thread groove 46 of the ball screw nut 42. Further, a circulation path R2, which is opened at connection points P1 and P2 set at two locations in the nut-side thread groove 46, is formed in the ball screw nut 42. In the ball raceway R1, the two connection points P1 and P2 corresponding to the opening positions are connected by the circulation path R2.

Therefore, in the ball screw device 22, when the ball screw nut 42 rotates relatively with respect to the rack shaft 3, each ball 43 rolls in the ball raceway R1 under load (a frictional force) from the rack shaft 3 and the ball screw nut 42, thereby transmitting the torque of the ball screw nut 42 to the rack shaft 3 and axially moving the rack shaft 3 with respect to the ball screw nut 42. Further, each ball 43 which has reached one end (the connection point P1 or the connection point P2) of the ball raceway R1 by rolling in the ball raceway R1 passes through the circulation path R2 formed in the ball screw nut 42, thereby being discharged to the other end (the connection point P2 or the connection point P1) of the ball raceway R1 and thus moving between the downstream side and the upstream side of the ball raceway R1. When the ball 43 newly enters from the ball raceway R1 into the circulation path R2, each ball 43 in the circulation path R2 is pushed by the other ball 43 adjacent to and posterior to the ball 43 in a circulation direction (a moving direction). Thus, the balls 43 move in the circulation path R2. That is, in the ball screw device 22, the balls 43 infinitely circulate in a movement pathway formed by the ball raceway R1 and the circulation path R2, whereby it is possible to convert the rotation of the ball screw nut 42 to the axial movement of the rack shaft 3. The EPS 1 has a configuration in which an assist force for assisting a steering operation is applied to the steering system by rotationally driving the ball screw nut 42 by using the motor 21 and transmitting the torque thereof to the rack shaft 3 as axial thrust.

In the ball screw device 22, the circulation path R2 is configured by fitting a circulation member (a deflector) 51 to the ball screw nut 42. The circulation member 51 has a function of taking up the balls 43 from the ball raceway R1 and a function of discharging the balls 43 to the ball raceway R1. That is, the ball screw device 22 is configured as a so-called deflector type ball screw device. In FIGS. 3 and 4, for convenience of description, illustration of the circulation member 51 is omitted.

More specifically, as shown in FIGS. 3 and 4, in the ball screw nut 42, a pair of fitting holes 52 and 53 radially extending through the ball screw nut 42 is formed at positions corresponding to the two connection points P1 and P2. The connection points P1 and P2 are set at positions between which a portion of the nut-side thread grooves 46 corresponding to several turns is sandwiched, in the axial direction of the ball screw nut 42, and the single movement pathway is formed by the ball raceway R1 and the circulation path R2 (refer to FIG. 1). Each of the fitting holes 52 and 53 is formed to have an elongated hole-shaped section, and the fitting holes 52 and 53 are formed at positions offset from each other in the circumferential direction (a vertical direction in FIG. 3) of the ball screw nut 42. A groove-shaped fitting recessed portion 54 connecting the fitting holes 52 and 53 is formed in the outer peripheral surface of the ball screw nut 42. Further, in the outer peripheral surface, shallow grooves 55 communicating with the fitting recessed portion 54 are formed so as to surround the fitting recessed portion 54. The fitting holes 52 and 53 and the fitting recessed portion 54 are formed so as to be symmetrical with respect to the center of the fitting recessed portion 54 when the ball screw nut 42 is viewed in the radial direction.

On the other hand, as shown in FIGS. 5 to 8, the circulation member 51 has a pair of insertion portions 61 and 62 which is respectively inserted into the fitting holes 52 and 53, and a connection portion 63 connecting the insertion portions 61 and 62. The circulation member 51 is formed so as to be symmetrical with respect to the center of the connection portion 63 (the circulation member 51) when the ball screw nut 42 is viewed in the radial direction.

Each of the insertion portions 61 and 62 is formed in an elongated hole shape corresponding to the sectional shape of each of the fitting holes 52 and 53. Insertion holes 64 and 65 are formed in the insertion portions 61 and 62. The insertion holes 64 and 65 are opened at insertion ends (lower ends in FIG. 6) 61a and 62a, and extend toward base ends (upper ends in FIG. 6) 61b and 62b from the insertion ends 61a and 62a while being smoothly curved. Thus, the insertion holes 64 and 65 are connected to the connection portion 63. The inside diameters of the insertion holes 64 and 65 are set to be slightly larger than the diameter of the ball 43. Further, at the insertion ends 61a and 62a, tongue portions 66 and 67 for taking up the balls 43 rolling in the ball raceway R1 into the insertion holes 64 and 65 are formed to protrude so as to be inserted into the shaft-side thread groove 41 of the rack shaft 3.

Figure 7:
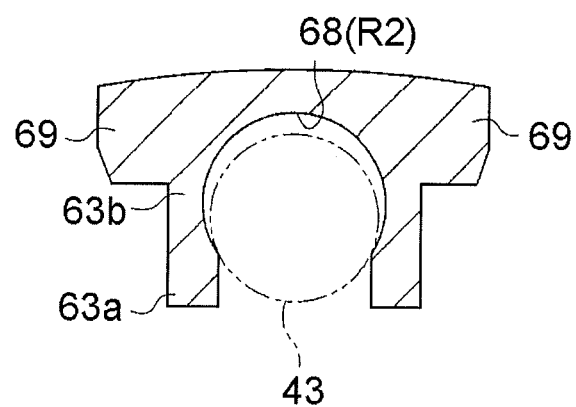
FIG. 7 is a sectional view taken along line B-B in FIG. 5.

The connection portion 63 is formed between the insertion portions 61 and 62 so as to connect the base ends 61b and 62b of the insertion portions 61 and 62. The connection portion 63 is formed in a substantially rectangular shape so that the connection portion 63 can be fitted into the fitting recessed portion 54 while in contact with the inner surface of the fitting recessed portion 54 (refer to FIGS. 3 and 4). As shown in FIG. 7, a connection groove 68 opened at an insertion end (a lower end in FIG. 7) 63a-side is formed in the connection portion 63. The connection groove 68 is formed in a substantially straight line shape along the axis of the connection portion 63 and both ends thereof communicate with the insertion holes 64 and 65, respectively. Then, a section perpendicular to an extending direction of the connection groove 68 is formed in a circular shape in which a portion at the insertion end 63a-side is cut out, and each ball 43 passing through the connection groove 68 is supported by the insertion end 63a. Further, flanges 69 corresponding to the shallow grooves 55 are formed at a base end (an end portion on the upper side in FIG. 6) 63b of the connection portion 63.

The circulation member 51 configured in this manner is fitted to the ball screw nut 42 by inserting the insertion portions 61 and 62 into the fitting holes 52 and 53, respectively, and also inserting the connection portion 63 and the flanges 69 into the fitting recessed portion 54 and the shallow grooves 55. The circulation path R2 is formed by the insertion holes 64 and 65 of the insertion portions 61 and 62 and the connection groove 68 of the connection portion 63, by fitting the circulation member 51 to the ball screw nut 42.

Figure 8:
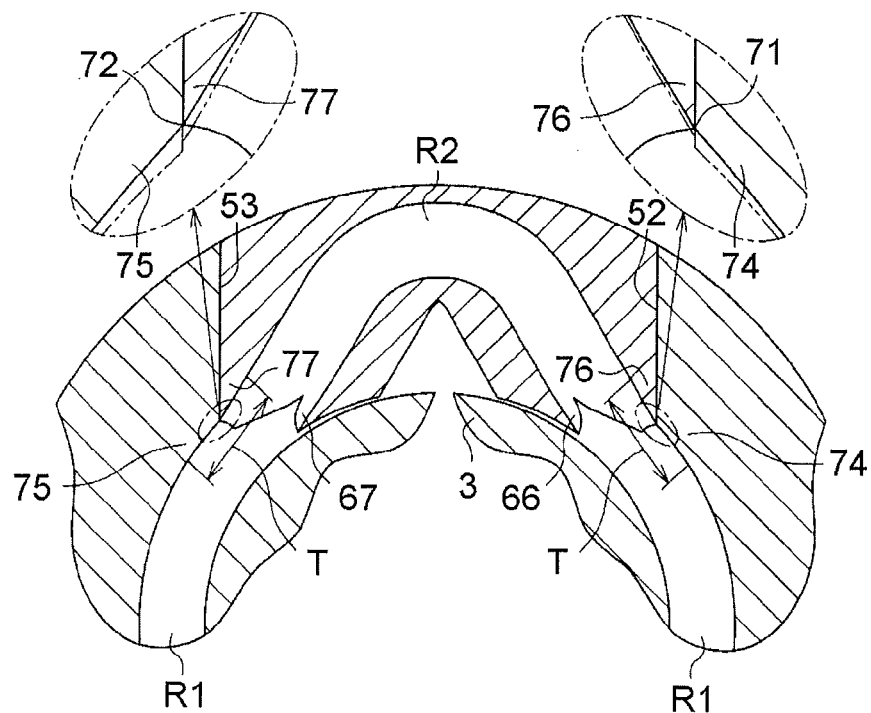
FIG. 8 is a sectional view showing a rack shaft, the circulation member, and the ball screw nut along a circulation direction of balls.

As shown by a two-dot chain line in FIG. 8, a difference in level may be caused in each of joint portions 71 and 72 between the ball raceway R1 and the circulation path R2 due to a dimensional accuracy of the circulation member 51, an accuracy in fitting the circulation member 51 to the ball screw nut 42, or the like. Therefore, in order to reduce the difference in level, processing such as polishing is performed on nut-side joint portions 74 and 75 (portions near the respective fitting holes 52 and 53, in the nut-side thread groove 46) and circulation member-side joint portions 76 and 77 (portions facing the respective tongue portions 66 and 67, in the circulation member 51), the nut-side joint portions 74 and 75 and the circulation member-side joint portions 76 and 77 constituting the joint portions 71 and 72. The processing is performed on processing areas T set respectively in the nut-side joint portion 74 and the circulation member-side joint portion 76, and in the nut-side joint portion 75 and the circulation member-side joint portion 77. When each ball 43 moves from the ball raceway R1 to the circulation path R2, the state of the ball 43 changes from a state of rolling while receiving axial load from both the rack shaft 3 and the ball screw nut 42 (a state of being in a load area) to a state of moving by being pushed by the other ball 43 adjacent to and posterior to the ball 43 in the circulation direction without receiving the axial load (a state of being in a no-load area), in the processing areas T in the nut-side joint portions 74 and 75.

Figure 9:
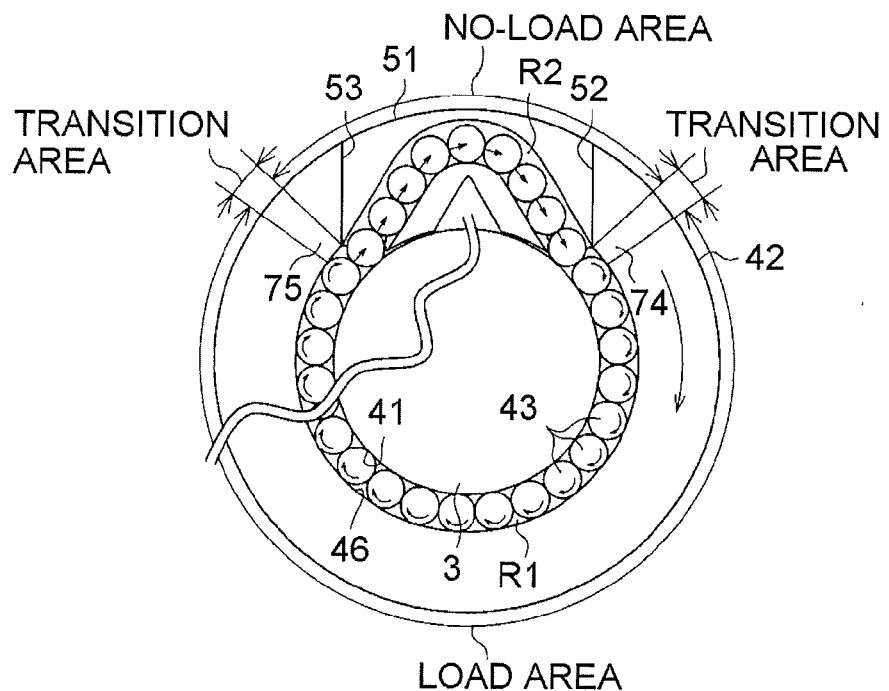
FIG. 9 is a sectional view showing the rack shaft, the circulation member, and the ball screw nut along the circulation direction of the balls.

Therefore, as shown in FIG. 9, in the movement pathway for the balls 43, an area of the ball raceway R1 except for the processing areas T in the nut-side thread groove 46 is the load area, substantially an entire area of the circulation path R2 is the no-load area, and the processing areas T are transition areas. The single movement pathway is formed in the ball screw device 22, and the nut-side thread groove 46 constituting the ball raceway R1 together with the shaft-side thread groove 41 is as shown by a broken line in FIG. 10 (in FIG. 10, for convenience of description, only portions of the nut-side thread groove 46 in the vicinity of the fitting holes 52 and 53 are shown). In the portion of the nut-side thread groove 46 shown in this drawing, hatched areas are non-movement areas into which no ball 43 moves, and the other area is an area where the balls 43 move actually, and functions as the movement pathway.

Figure 10:
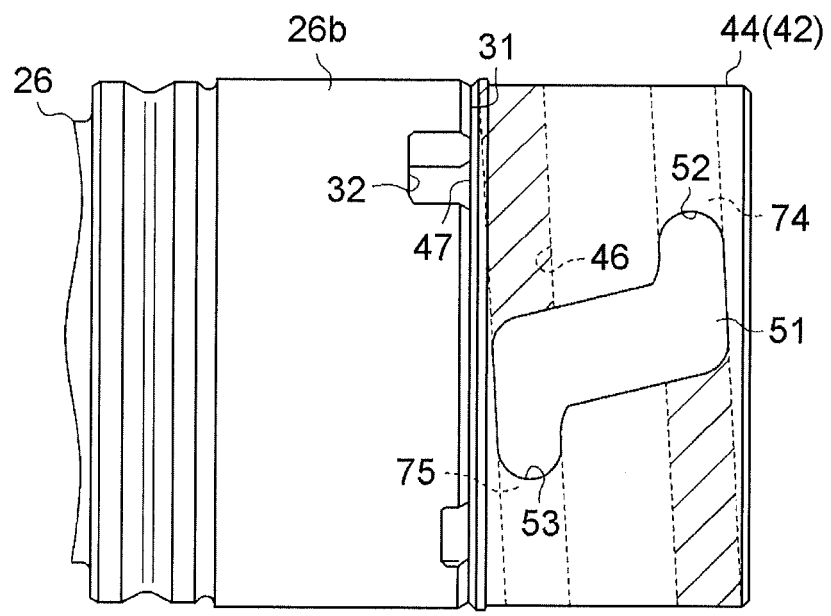
FIG. 10 is a partial side view showing the ball screw nut in a state where the circulation member is fitted and the motor shaft, when viewed from the outside in the radial direction.

Therefore, in the area of the nut-side thread groove 46, which functions as the movement pathway, the transition area (the processing area T) provided in the vicinity of the fitting hole 53 close to the motor shaft 26, that is, the transition area T in the nut-side joint portion 75 is the transition area closest to the seating surface 31. Further, in the nut-side thread groove 46, the non-movement area into which no ball 43 moves and which extends from the fitting hole 53 to the side opposite to the movement pathway for the balls 43 is provided to extend from the main body portion 44 to the engagement portion 45 of the ball screw nut 42 (refer to FIG. 4). In the non-movement area, an area provided in the main body portion 44 (an area closer to the fitting hole 53 than the seating surface 31) is an in-main-body non-movement area. In FIG. 10, for convenience of description, only a part of a site constituting the in-main-body non-movement area in the nut-side thread groove 46 is hatched and shown.

As described above, when the contact surface 47 of the ball screw nut 42 is pressed against the seating surface 31 of the motor shaft 26 by an axial force which is generated by the engagement of the male thread portion 49 and the female thread portion 34, the sites in the contact surface 47, which face the cut portions 32, are inserted into the cut portions 32 so as to bulge out into the cut portions 32, whereby the ball screw nut 42 is easily deformed to a large extent. Since the balls 43 roll under load in the load area, it is preferable to make it difficult for a distortion to occur in a site constituting the load area in the nut-side thread groove 46 even when the ball screw nut 42 is partly deformed due to the cut portions 32, in order to secure smooth circulation of the balls 43.

In a case where the ball screw nut 42 is pressed against the seating surface 31 in the axial direction, a phase range (a circumferential range), in which the fitting holes 52 and 53 are provided, is easily deformed, because the phase range is equivalent to a range where recesses are formed by the fitting holes 52 and 53. On the other hand, the transition ranges are relatively easily deformed because the transition ranges are present in the vicinity of the fitting holes 52 and 53 where the circulation member 51 is fitted. In addition, the transition range closer to the seating surface 31 is more easily deformed. That is, if the transition area on the nut-side joint portion 75-side close to the seating surface 31 overlaps the phase range of the cut portion 32, a distortion easily occurs in a site which becomes the load area, under the influence of a distortion in a site which becomes the transition area in the nut-side thread groove 46.

In view of this point, as shown in FIG. 2, the male thread portion 49 is formed such that the transition area on the nut-side joint portion 75-side does not overlap the phase ranges of the cut portions 32 in a state in which the ball screw nut 42 is fastened to the motor shaft 26 with predetermined tightening torque. The predetermined tightening torque is set to a value that can fully prevent occurrence of looseness of the ball screw nut 42. More specifically, the male thread portion 49 is formed such that the in-main-body non-movement area in the nut-side thread groove 46 overlaps the phase ranges of the cut portions 32. In addition, the male thread portion 49 in this embodiment is formed such that the transition area on the nut-side joint portion 75-side overlaps the phase range of the recessed portion 33 on one side.

Next, fitting (operation) of the ball screw nut to the motor shaft in the EPS of this embodiment will be described. The ball screw nut 42 is fastened to the motor shaft 26 by engaging the male thread portion 49 with the female thread portion 34 with predetermined tightening torque in a state where the rotation of the motor shaft 26 is restricted by inserting the jig for fixing into the cut portions 32. Thus, in the contact surface 47 of the ball screw nut 42, the sites facing the cut portions 32 are deformed so as to be inserted into the cut portions 32. At this time, the site constituting the in-main-body non-movement area in the nut-side thread groove 46 is distorted most, the in-main-body non-movement area overlapping the phase ranges of the cut portions 32. A distortion hardly occurs in the sites constituting the load area and the transition area in the nut-side thread groove 46.

Next, the effects of this embodiment will be described.

(1) Since the transition area on the nut-side joint portion 75-side in the nut-side thread groove 46 does not overlap the phase ranges of the cut portions 32, it becomes difficult for a distortion to occur in the site constituting the load area in the nut-side thread groove 46, as described above. Thus, it is possible to secure smooth circulation of the balls 43, and thus it is possible to improve the quietness of the EPS 1, for example.

(2) Since the in-main-body non-movement area in the nut-side thread groove 46 overlaps the phase ranges of the cut portions 32, as described above, the non-movement area is most easily distorted under the influence of partial deformation of the ball screw nut 42 due to the cut portions 32, and it becomes even more difficult for a distortion to occur in the site that becomes the load area in the nut-side thread groove 46. Thus, smoother circulation of the balls can be secured.

It is also possible to implement the above-described embodiment in the following forms in which the embodiment is appropriately modified.

In the above-described embodiment, the number of cut portions 32 may be one or three or more and can be changed appropriately.

In the above-described embodiment, processing for reducing a difference in level does not need to be performed on the nut-side joint portions 74 and 75 in the nut-side thread groove 46. In this case, each of the joint portions 71 and 72 between the ball raceway R1 and the circulation path R2 becomes a transition area.

In the above-described embodiment, the male thread portion 49 is formed such that the in-main-body non-movement area in the nut-side thread groove 46 overlaps the phase ranges of the plurality of cut portions 32. However, the male thread portion 49 may be formed such that the in-main-body non-movement area overlaps only the phase range of any one of the cut portions 32. Further, the male thread portion 49 may be formed such that the in-main-body non-movement area does not overlap the phase ranges of the cut portions 32.

In the above-described embodiment, the male thread portion 49 is formed such that the transition area on the nut-side joint portion 75-side substantially coincides with the phase range of the recessed portion 33. However, the present invention is not limited to this configuration, and for example, by forming the recessed portion 33 alongside the cut portion 32, or abolishing the recessed portion 33, the transition area may be made coincident with a phase range of a flat site in the seating surface 31.

In the above-described embodiment, the EPS 1 is of a rack assist type in which the motor 21 and the motor shaft 26 as a hollow shaft are disposed coaxially with the rack shaft 3. However, the present invention is not limited to this configuration, and the EPS may be of a type in which a hollow shaft with a rack shaft inserted therein is driven by a motor provided outside a housing, such as a so-called rack cross type or a rack parallel type.

In the above-described embodiment, the single movement pathway is formed by fitting the single circulation member 51 to the ball screw nut 42. However, the present invention is not limited to this configuration, and a plurality of independent movement pathways may be formed by fitting a plurality of circulation members to the ball screw nut 42. In this case, a male thread portion is formed such that the transition area closest to the seating surface 31, in the movement pathway formed by the circulation member 51 disposed at a position closest to the seating surface 31, does not overlap the phase range(s) of the cut portion(s) 32.

In the above-described embodiment, the ball screw device 22 may be used in uses other than the EPS.

What is claimed is:

1. A ball screw device comprising:
a threaded shaft having an outer periphery in which a shaft-side thread groove is formed;
a ball screw nut having an inner periphery in which a nut-side thread groove is formed; and
a plurality of balls disposed in a spiral ball raceway that is formed by the shaft-side thread groove and the nut-side thread groove that face each other,
wherein a circulation member is fitted to fitting holes so that a circulation path is configured, the fitting holes radially extending through a main body portion of the ball screw nut, the main body portion having the nut-side thread groove, and the circulation path connecting two points in the ball raceway so as to allow infinite circulation of the balls that roll in the ball raceway,
wherein a male thread portion is formed on the ball screw nut, the male thread portion protruding from the main body portion in an axial direction, and the male thread portion being screwed to a female thread portion formed in a fitting target,
wherein a cut portion extending in a radial direction is formed in a seating surface of the fitting target, the seating surface facing the ball screw nut in the axial direction, and
wherein, in a movement pathway for the balls, which is formed by the ball raceway and the circulation path, (i) an area where the balls roll under load from the threaded shaft and the ball screw nut is set as a load area, (ii) an area where each of the balls moves by being pushed by another ball adjacent to and posterior to the ball in a circulation direction of the balls is set as a no-load area, and (iii) areas, each of the areas is located between the load area and the no-load area, are set as transition areas, and
the male thread portion is formed such that the transition area closest to the seating surface does not overlap a phase range of the cut portion in a state where the ball screw nut is fastened to the fitting target.

2. The ball screw device according to claim 1, wherein the male thread portion is formed such that an in-main-body non-movement area in a non-movement area overlaps the phase range of the cut portion in the state where the ball screw nut is fastened to the fitting target, the in-main-body non-movement area being provided in the main body portion, and the non-movement area extending from the fitting hole closest to the seating surface to a side opposite to the movement pathway for the balls.

3. An electric power steering system comprising:
a rack shaft provided to reciprocate in an axial direction;
a hollow shaft in which the rack shaft is inserted, the hollow shaft being rotated by motor drive; and
the ball screw device according to claim 1 in which the rack shaft is the threaded shaft and the hollow shaft is the fitting target.

* * * * *